Sept. 24, 1957  E. L. SCHEIDENHELM  2,807,127
HARVESTER PLATFORM SUPPORT LINKAGE
Filed Oct. 5, 1956  7 Sheets-Sheet 3
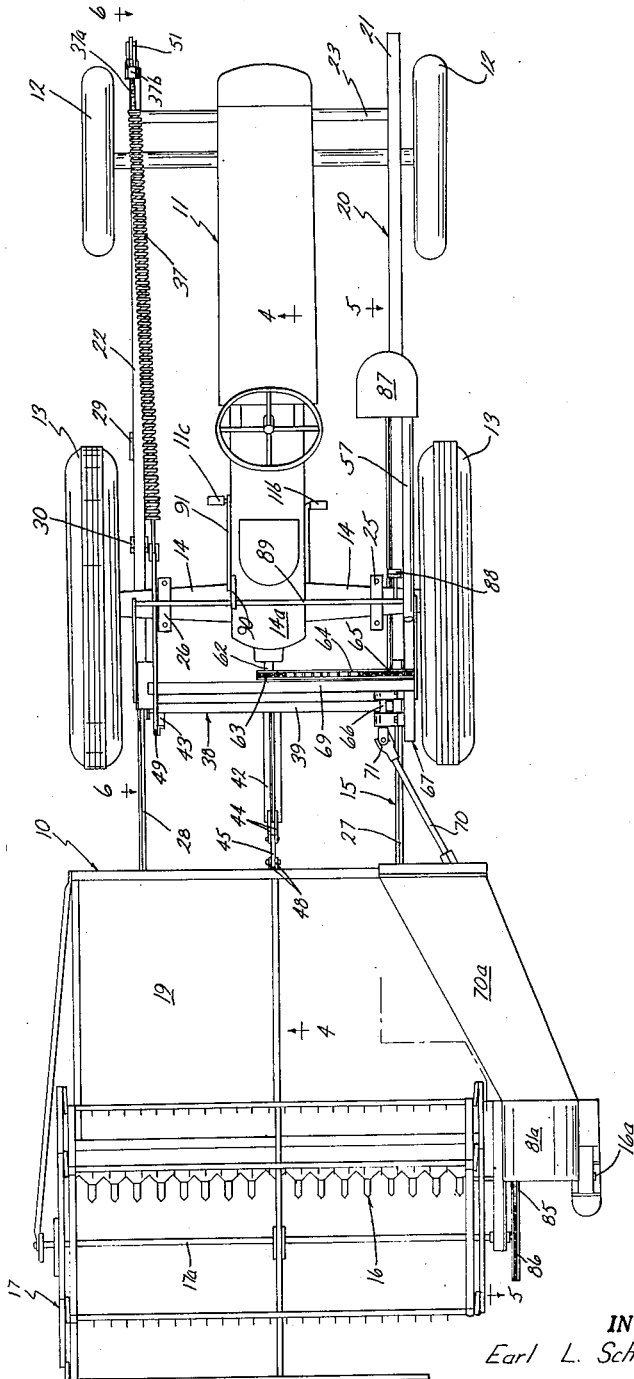
INVENTOR.
Earl L. Scheidenhelm
BY
Greeblvells
Atty.

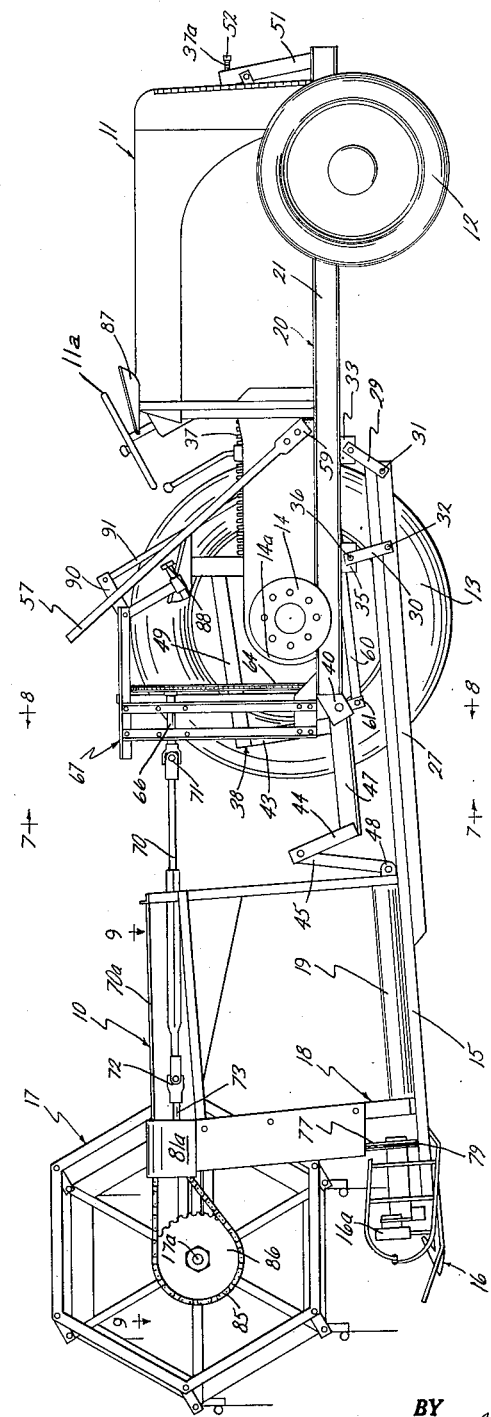

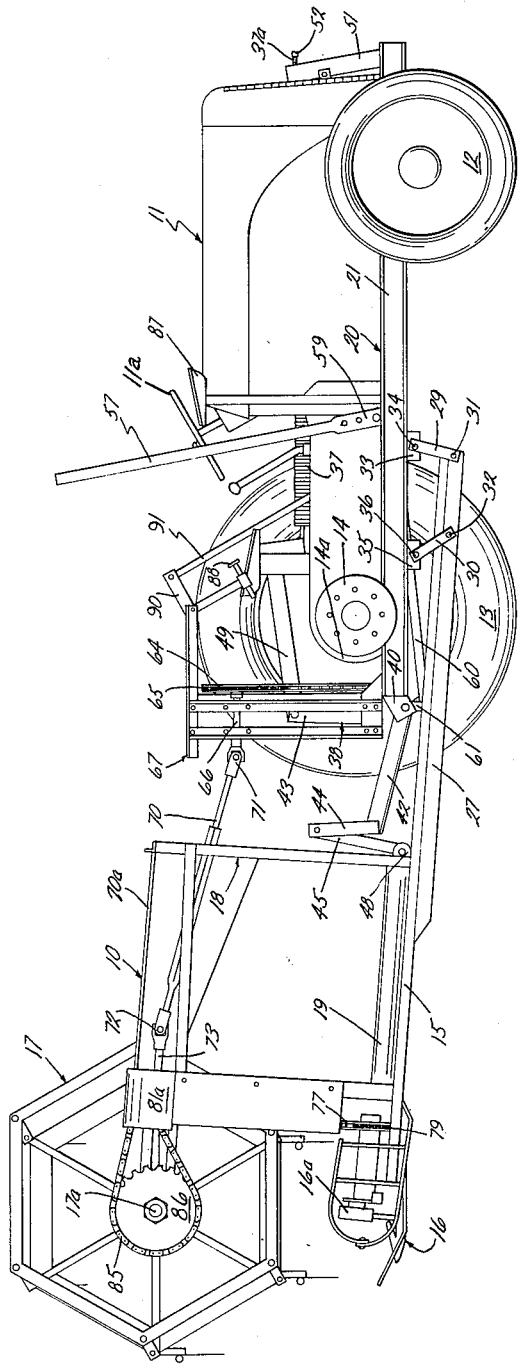

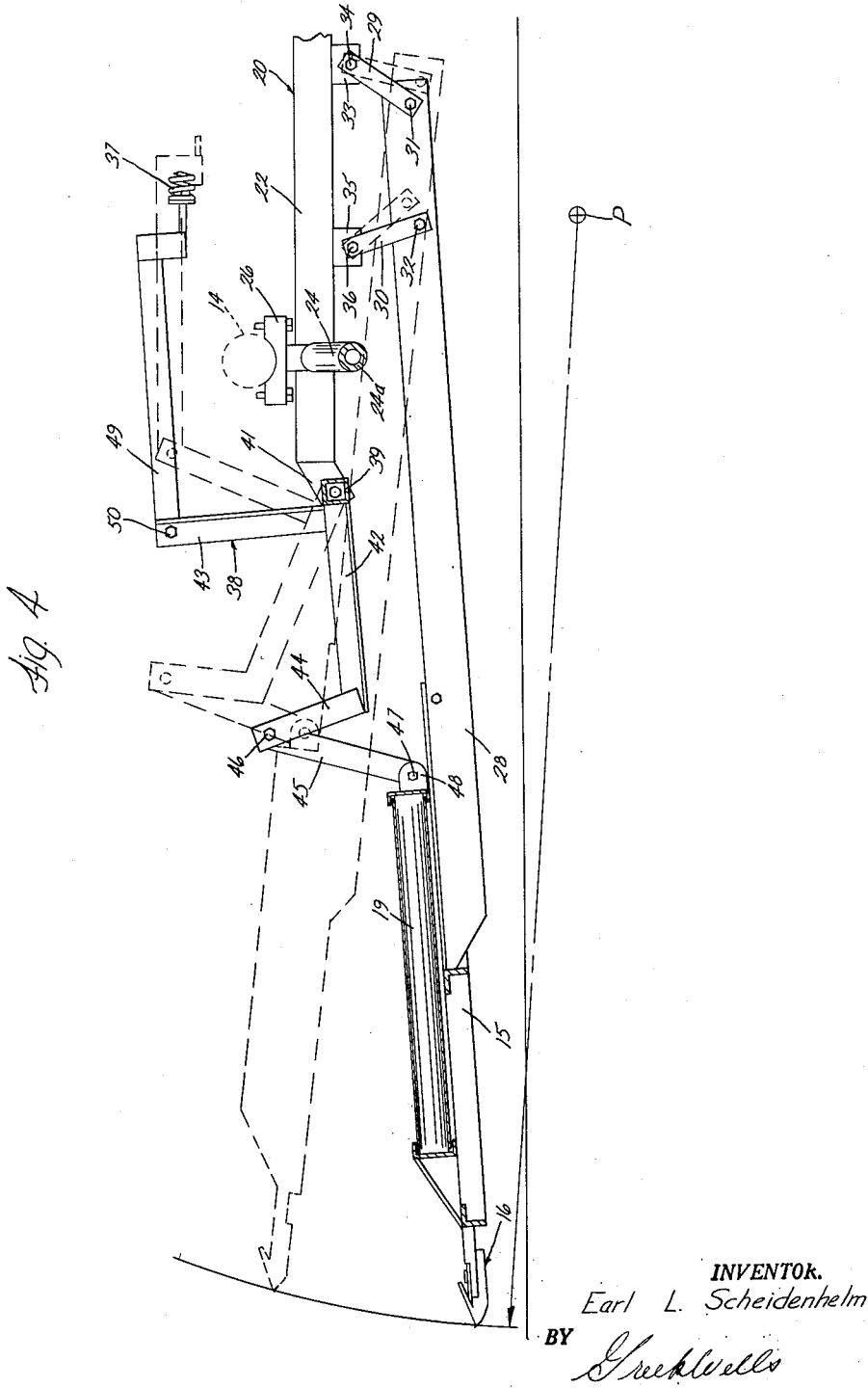

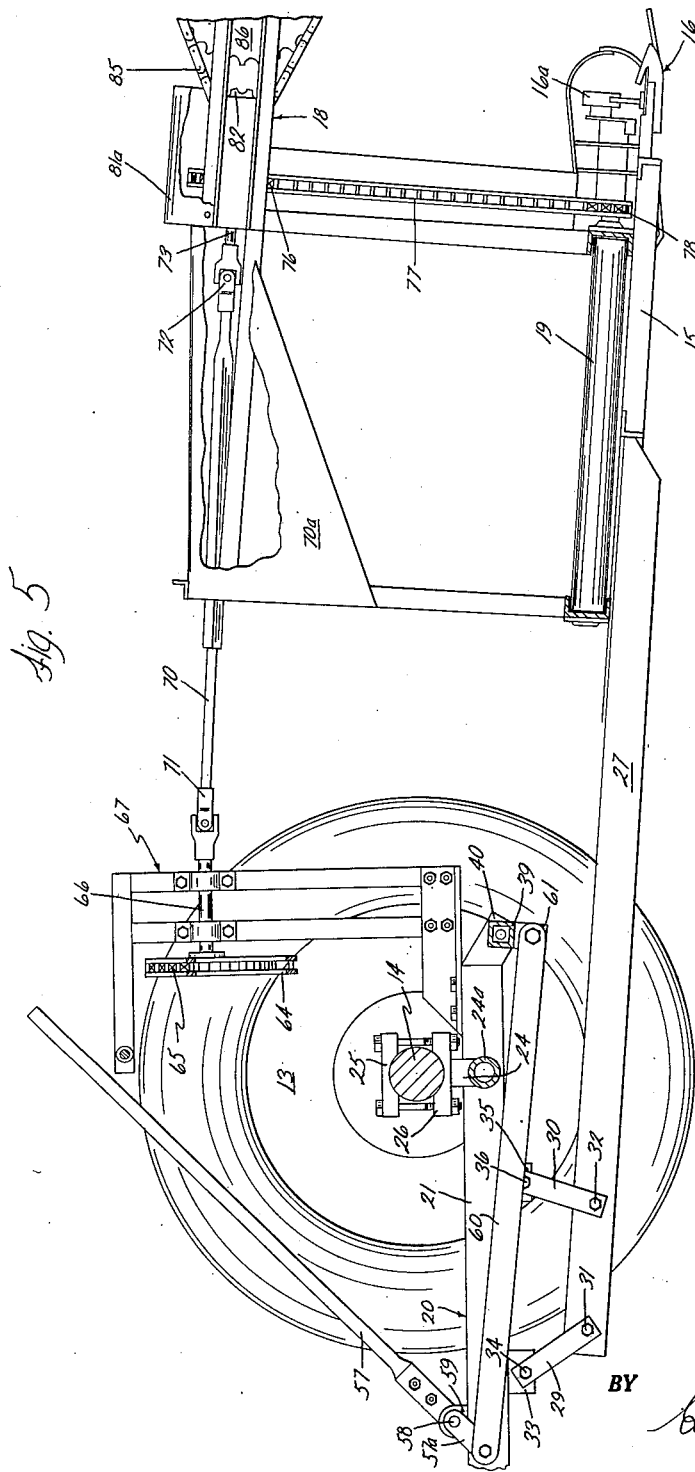

Sept. 24, 1957　　　E. L. SCHEIDENHELM　　　2,807,127
HARVESTER PLATFORM SUPPORT LINKAGE
Filed Oct. 5, 1956　　　　　　　　　　　　　　　7 Sheets-Sheet 6
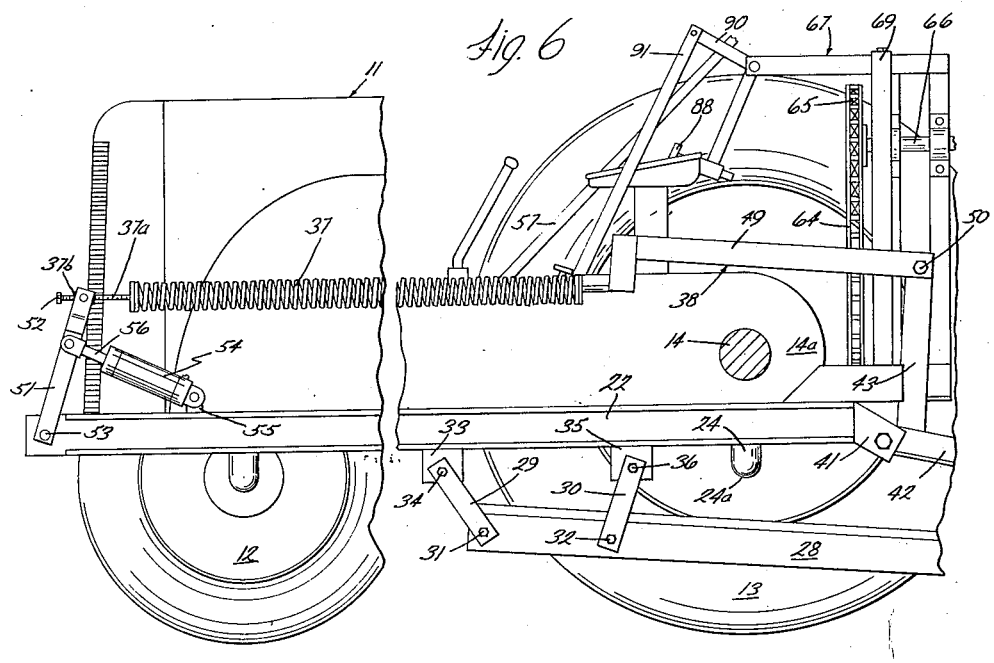
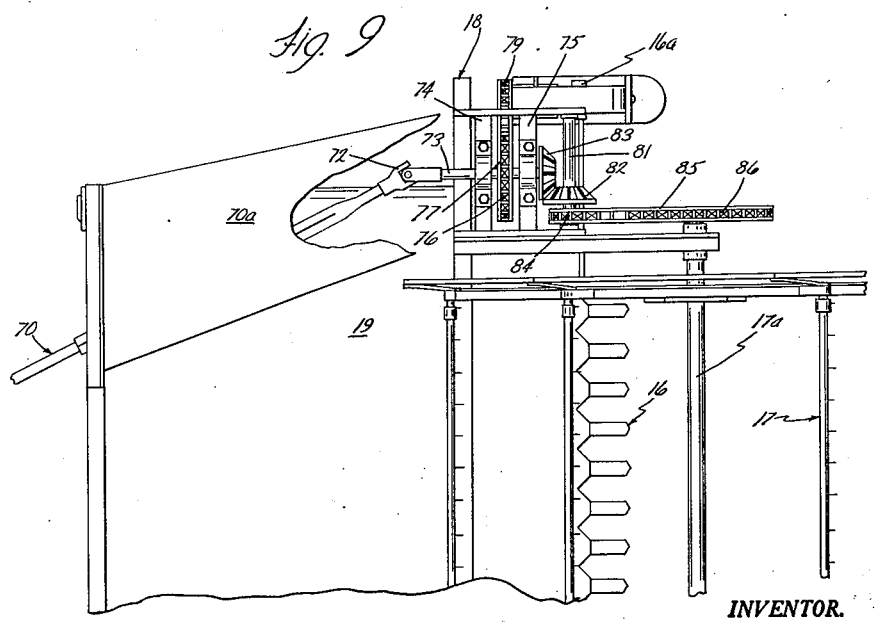
INVENTOR.
Earl L. Scheidenhelm
BY
Atty.

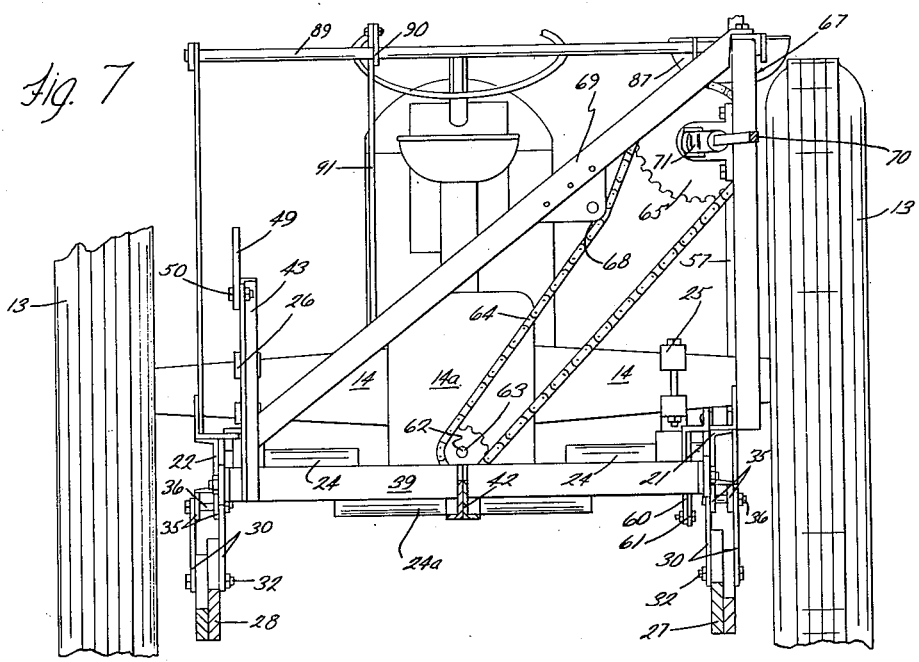
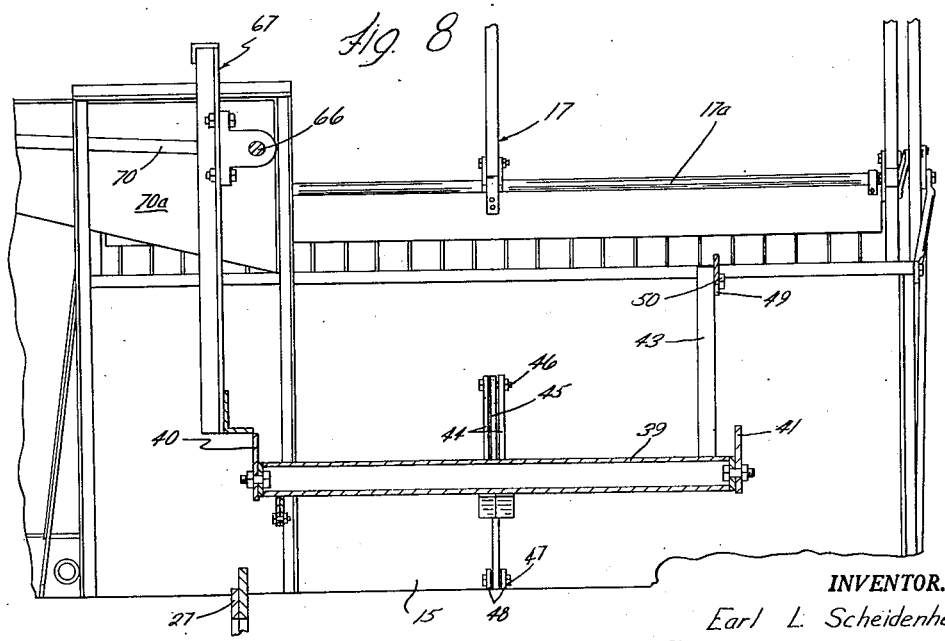

United States Patent Office 2,807,127
Patented Sept. 24, 1957

2,807,127

HARVESTER PLATFORM SUPPORT LINKAGE

Earl L. Scheidenhelm, Mendota, Ill., assignor to Horace D. Hume, Mendota, Ill.

Application October 5, 1956, Serial No. 614,149

6 Claims. (Cl. 56—208)

The present invention relates to improvements in harvester platform support linkage.

In certain parts of the country harvesting equipment of the tractor mounted windrowing type has come into wide usage. This type of equipment includes a harvester platform having a cutting mechanism, a reel, and a windrow forming draper, mounted to and carried by a tractor which serves both as the motive means to propel the harvester through the field, and as the power supply for the several working parts. Normally the harvester is mounted at the rear of the tractor and propelled by driving the tractor in reverse. The weight of the harvester is generally carried by the tractor, there being means included to counterbalance the harvester on the tractor to permit a relatively free "floating" action of the harvester with respect to the ground. The basic connection between the harvester and the tractor is normally a pivot means spaced behind the harvester and sufficiently above the ground to give adequate clearance in the field. Such devices are not wholly satisfactory for the reason that the above mentioned pivot means about which the vertical movement of the harvester centers, is above the level of the cutting mechanism when the machine is in operation. Therefore, the force between the cutting mechanism and the ground generated by pushing the harvester over the ground, acts below the pivot means and creates a moment which tends to force the cutting mechanism even harder against the ground. This is especially bad when the cutting mechanism engages an obstruction such as a rock since the moment tends to push the cutting mechanism down rather than up, as the cutting mechanism must go to clear the obstruction.

It is the purpose of the present invention to provide platform supporting means for harvesters of the type hereinbefore described, so constructed as to mount the harvester to the tractor for vertical pivotal movement about a center point positioned below the ground level, the supporting means being positioned substantially above ground level.

A further purpose of the invention is to provide such a mounting means including spring counterbalancing means supporting the harvester platform for free floating movement with respect to the ground.

The nature and advantages of the invention will appear more clearly from the following description and the accompanying drawings wherein a preferred form of the invention is shown. It should be understood, however, that the drawings and description are illustrative only and are not intended to limit the invention except insofar as it is limited by the claims.

In the drawings:

Figure 1 is a view in side elevation of a harvesting device embodying my invention, in operating position;

Figure 2 is a view similar to Figure 1 but showing the device with the header raised above the ground;

Figure 3 is a plan view of the harvesting device;

Figure 4 is an enlarged fragmentary sectional view of the supporting linkage taken substantially on the line 4—4 of Figure 3, but with the tractor not shown;

Figure 5 is an enlarged fragmentary sectional view taken on the line 5—5 of Figure 3;

Figure 6 is an enlarged fragmentary sectional view taken substantially on the line 6—6 of Figure 3;

Figure 7 is an enlarged fragmentary sectional view taken substantially on the line 7—7 of Figure 1;

Figure 8 is an enlarged fragmentary sectional view taken substantially on the line 8—8 of Figure 1; and Figure 9 is an enlarged fragmentary plan view with parts broken away, looking in the direction of the arrows 9—9 of Figure 1.

Referring now to the drawings, and to Figures 1, 2 and 3 in particular, my invention is shown as embodied in a harvester comprised of a cutting and windrowing header generally indicated by the numeral 10 and carried by a tractor generally indicated at 11. As shown in the drawings, the tractor 11 is of the wheeled type, having front steerable wheels 12 and rear driving wheels 13. The rear wheels 13 are mounted on an axle housing 14 which forms a portion of the main frame of the tractor 11. Harvesting devices of the general character of the machine 10—11 are not uncommon and are generally constructed as shown in the drawings with the header 10 mounted at the rear of the tractor 11, the tractor 11 being operated in reverse during operation of the device.

The header 10 comprises a substantially horizontal frame or platform 15 which has a cutting mechanism 16, including the usual cutter bar and sickle assembly, mounted at the front edge. Inasmuch as the cutting mechanism 16 may be of any suitable type, it is not shown in detail. The assembly 15 is shown as rigidly mounted in the drawings, but it should be understood that any suitable mounting, whether rigid or "floating" may be utilized without departing from the scope of the invention. The header platform 15 also mounts a reel 17 which is rotatably supported above the cutting mechanism 16 by a pair of vertical end frames 18 secured to the platform 15. A transverse draper 19 is supported on the platform 15 behind the cutting mechanism 16 and is adapted to move the cut crop to one side of the platform 15 where it is discharged to form a windrow.

In carrying out my invention, I provide on the tractor 11, a harvester supporting frame 20 which comprises a pair of fore and aft extending frame members 21 and 22, positioned at each side of the tractor 11 inside the wheels 12 and 13. The members 21 and 22 are connected at the rear ends by a cross bar 23 secured to the tractor body, and are connected near their front ends by a cross bar 24 which extends beneath the axle housing 14. As best shown in Figures 3, 4 and 7, the cross bar 24 is secured to the axle housing 14 by clamps 25 and 26, and has a U-shaped intermediate portion 24a to allow room for the differential housing 14a at the center of the axle housing 14.

In order to mount the harvester platform 15 to the frame 20, a pair of spaced apart carrying arms 27 and 28 are provided. The forward ends of the arms 27 and 28 extend beneath and are secured to the platform 15. The rearward ends of the arms 27 and 28 extend beneath the side members 21 and 22 of the frame 20, terminating intermediate the front and rear wheels 12 and 13.

Each of the arms 27 and 28 is mounted to the adjacent member 21 or 22 by two pairs of links 29 and 30. The pair of links 29 is pivoted to arm 27 or 28 at the rear edge thereof, the links 29 extending upwardly at each side of the arm 27 or 28 and connected thereto by a pivot pin 31. The pair of links 30 is pivoted to the arms 27 or 28 at a point spaced forwardly from the links 29 by a pivot pin 32. The links 29 are pivoted at their upper ends to a bracket 33 on the adjacent frame member 21 or 22 by a pin 34 and the links 30 are pivoted in like manner to a second bracket 35 by a pin 36. As shown in the drawings, the upper pivot pins 34 and 36 of the links 29 and 30 are spaced apart a greater distance than the lower pivot pins 31 and 32, so that the links 29 and 30, together with the carrying arm 27 or 28 and the frame member 21 or 22, form a trapezoid in a vertical plane. With this construction, the carrying arms 27 and 28 are so mounted that upward movement of their free or platform carrying ends can only occur by moving the carrying arms 27 and 28 rearwardly, causing the rearward links 29 to pivot downwardly and rearwardly while the front links 30 pivot upwardly and rearwardly. Figure 4 best illustrates the movement of the carrying arms 27 and 28. As shown, the upward and rearward movement of the carrying arms 27 and 28 causes the platform 15 and the cutting mechanism 16 to move about a theoretical pivot point P spaced rearwardly of the platform 15 and substantially below the ground level. With this construction, any rearwardly directed force against the cutting mechanism 16 or the platform 15, such as the frictional force between the cutting mechanism and the ground, or force created by encountering a rock or other obstacles, tends to lift the platform 15, thereby reducing the friction force or surmounting the obstacle.

Since the links 29 and 30 mount the carrying arms 27 and 28 for free vertical movement, it is necessary to provide means to counterbalance the weight of the header 10 on the arms 27 and 28, so as to permit the header to "float." If the header is properly counterbalanced, the upward force created by ground resistance or obstacles will be sufficient to raise the header 10 until the force is abated. To counterbalance the header 10 on the arms 27 and 28, I provide a counterbalancing spring 37 and bellcrank 38. The bellcrank 38 comprises a pivot bar or axle 39 rotatably mounted between brackets 40 and 41 secured to the forward ends of the frame members 21 and 22. The pivot bar 39 has a substantially horizontally extending radial arm 42 fixed thereto near the center, and a substantially vertically extending radial arm 43 fixed thereto near one end. The horizontal arm 42 has an upright extension 44 fixed to its free end which has a depending link 45 pivoted thereto by a pin 46. The link 45 is pivoted at its opposite end to a pin 47 secured between ears 48 on the rear edge of the platform 15. The vertical arm 43 of the bellcrank 38 has a spring mounting arm 49 pivoted to its free end by a pin 50. The arm 49 is fixed to one end of the counterbalancing spring 37. The spring 37 extends rearwardly over the frame member 22. The rear end of the spring 37 is secured to an adjustment bolt 37a which, in turn, is journalled in a sleeve 37b, pivoted in the bifurcated upper end of a lever 51. A nut 52 threaded on the bolt 37a beyond the sleeve 37b secures the spring 37 in place. The lever 51 is pivoted by a bolt 53 to the rearward edge of the frame member 22. A hydraulic cylinder 54 is provided to hold the lever in adjusted position to control the tension of the spring 37. The cylinder 54 is pivoted to an ear 55 on the frame member 22 and has a piston 56 which is pivoted to the lever 51, as shown in Figure 6. With this construction, operation of the cylinder 54, which is connected to the hydraulic system of the tractor 11, to push the lever 51 rearwardly, extends the spring 37 and increases the lifting force on the bellcrank 38, thereby increasing the lifting force against the platform 15. Operation of the cylinder 54 in the opposite direction, reduces the lifting force on the platform 15. It will be noted that at all times, the pull of the spring 37 is substantially at right angles to the arm 43 of the bellcrank 38, and the arm 42 is substantially at right angles to the force it lifts. This being true, the weight of the header 10 is easily matched and balanced by the spring 37, and the balance remains substantially unchanged throughout the area of movement of the header 10.

A hand lever 57 is also provided to control the height of the header 10 above the ground. The hand lever 57 is pivoted by a pin 58 to an ear 59 on the frame member 21, as best shown in Figures 1, 2 and 5, and has a portion 57a which extends downwardly below the pivot pin 58. A push rod 60 is pivoted to the lower end of the portion 57a and extends forwardly to the pivot bar 39 of the bellcrank 38. The push bar 60 is pivoted to a lever arm 61 fixed to the pivot bar 39 of the bellcrank 38. When it is desired to manually raise the header 10, the hand lever 57 may be pulled rearwardly, thereby pushing the push bar 60 forwardly and pivoting the pivot bar 39 of the bellcrank 38 in a direction to lift the platform 15.

The operating members of the header 10, namely the cutting mechanism 16, the reel 17, and the draper 19, are driven from the tractor 11. As best shown in Figures 3 and 7, the tractor 11 has a power take-off shaft 62 emerging from the differential housing 14a. A gear 63 is fixed to the shaft 62. The gear 63 drives a chain 64 which is trained around a gear 65 mounted on a drive shaft 66 journalled near the top of a vertical frame 67 secured to the forward end of the frame member 21, as shown in Figures 5 and 7. An idler 68 is also meshed with the chain 64 and is mounted on a diagonal brace 69 which extends from the top of the vertical frame 67 to the frame member 22. The drive shaft 66 is coupled to an extensible universal drive shaft 70 through a universal coupling 71. The universal shaft 70 extends to the header 10 and is coupled through a universal coupling 72 to a shaft 73 journalled between a pair of horizontal frame pieces 74 and 75 which form part of the vertical frame 18 at the windrow forming side of the header 10 (see Figure 9). The shaft 73 has a gear 76 thereon which, through a chain 77, drives a gear 78 fixed to one of the draper rollers of the draper 19 and also drives a gear 79 on the drive means 16a of the cutting mechanism 16.

An idler shaft 81, mounted on the vertical end frame 18 adjacent to the frame pieces 74 and 75 has a bevel gear 82 thereon which meshes with a bevel gear 83 on the shaft 73 and is driven thereby. The idler shaft 81 also mounts a sprocket 84 which through a chain 85, drives a sprocket 86 mounted on the central shaft 17a of the reel 17, thereby supplying power to the reel 17. Shields 70a and 81a protect the shafts 70 and 81 and associated mechanism. With the drive mechanism just described, each of the operating elements of the header 10 is powered from the power take-off shaft 62 of the tractor 11. The universal shaft 70 and couplings 71 and 72 transmit power to the header 10 regardless of its position with respect to the tractor 11.

Since the tractor 11 is so connected to the header 10 as to be driven in reverse during use of the header 10 to harvest grain or other crops, I provide an auxiliary operator's seat 87 on the frame 20 beside the tractor body and near the steering wheel 11a of the tractor 11. The seat 87 is so positioned as to give the operator easy steering control and control of the tractor brakes 11b. Since the clutch lever 11c of the tractor 11 is on the opposite side of the tractor body, an auxiliary clutch 88 is provided, it being connected to the tractor clutch 11c through a shaft 89 and actuating levers 90 and 91, as shown in Figures 1, 2 and 3.

The novel header supporting means hereinbefore described provides an extremely simple and useful supporting and coupling means by which the header 10 may be coupled to the tractor 11 for efficient action in the field. The unique supporting means, including the carrying arms 27 and 28 together with the links 29 and 30, give adequate ground clearance, and yet support the header 10 for movement about a theoretical center P positioned below the ground level, thus producing the much desired result of causing any resistance to forward movement of the header to produce a lifting tendency on the header 10. The counter-balancing means including the spring 37 and bellcrank 38 support the header 10 in a weightless or "floating" position for free movement up or down under the influence of small forces. The spring tensioning means, including the lever 51 and hydraulic cylinder 54, provide means for rapid and easy adjustment of the counter-balancing force, as well as control of the operating level of the header 10. The hand lever 57 allows the operator to hold the header rigid with the tractor 11 at any height and allows him to raise and lower the header 10 without disturbing the counter-balancing force.

It is believed that the nature and advantages of the invention appear clearly from the foregoing description.

Having thus described my invention, I claim:

1. In a harvester including a frame having a cutting mechanism thereon carried by a powered vehicle and adapted to be pushed ahead of the powered vehicle, means for mounting the frame to the powered vehicle comprising carrying arm means secured to the frame and extending to the powered vehicle, first vertical link means pivoted between said carrying arm means and the powered vehicle, second vertical link means pivoted between said carrying arm means and the powered vehicle, said second link means being spaced from said first link means in a fore and aft direction, and the upper ends of said first and second link means being spaced apart a greater distance than the lower ends thereof so that when the arm means are moved rearwardly the front ends must rise, and means on the vehicle for counter-balancing the weight of the frame.

2. In a harvester including a frame having a cutting mechanism thereon carried by a powered vehicle and adapted to be pushed ahead of the powered vehicle, means for mounting the frame to the powered vehicle comprising carrying arm means secured to the frame and extending to the powered vehicle, first vertical link means pivoted between said carrying arm means and the powered vehicle, second vertical link means pivoted between said carrying arm means and the powered vehicle, said second link means being spaced from said first link means in a fore and aft direction, and the upper ends of said first and second link means being spaced apart a greater distance than the lower ends thereof so that when the arm means are moved rearwardly the front ends must rise, and means on the vehicle for counter-balancing the weight of the frame, said last named means comprising a bellcrank pivoted on the vehicle, spring means secured to one arm of the bellcrank and anchored to the vehicle, and the other arm of the bellcrank being connected to the frame.

3. In a harvester including a frame having a cutting mechanism thereon carried by a powered vehicle and adapted to be pushed ahead of the powered vehicle, means for mounting the frame to the powered vehicle comprising carrying arm means secured to the frame and extending to the powered vehicle, first vertical link means pivoted between said carrying arm means and the powered vehicle, second vertical link means pivoted between said carrying arm means and the powered vehicle, said second link means being spaced from said first link means in a fore and aft direction so that when the arm means are moved rearwardly the front ends must rise, and means on the vehicle for counter-balancing the weight of the frame.

4. In a harvester including a frame having a cutting mechanism thereon carried by a powered vehicle and adapted to be pushed ahead of the powered vehicle, means for mounting the frame to the powered vehicle comprising a fore and aft extending carrying arm secured to the frame, first vertical link means pivoted to the carrying arm and pivoted to the powered vehicle and operable to move the rearward end of the carrying arm downwardly as it moves rearwardly, second vertical link means pivoted to the carrying arm forwardly of said first link means and pivoted to the powered vehicle and operable to move the carrying arm upwardly as it is moved rearwardly, and means on the vehicle for counter-balancing the weight of the frame on the carrying arm.

5. In a harvester including a frame having a cutting mechanism thereon carried by a powered vehicle and adapted to be pushed ahead of the powered vehicle, means for mounting the frame to the powered vehicle comprising a fore and aft extending carrying arm secured to the frame, first vertical link means pivoted to the carrying arm and pivoted to the powered vehicle and operable to move the rearward end of the carrying arm downwardly as it moves rearwardly, second vertical link means pivoted to the carrying arm forwardly of said first link means and pivoted to the powered vehicle and operable to move the carrying arm upwardly as it is moved rearwardly, and means on the vehicle for counter-balancing the weight of the frame on the carrying arm, said last named means comprising a bellcrank pivoted to the vehicle, a spring secured to one arm of the bellcrank and anchored to the vehicle, and the opposite arm of the bellcrank being connected to the frame.

6. In a harvester including a frame having a cutting mechanism thereon carried by a powered vehicle and adapted to be pushed ahead of the powered vehicle, means for mounting the frame to the powered vehicle comprising a pair of transversely spaced fore and aft extending carrying arms secured to the frame, said carrying arms extending rearwardly from the frame to the powered vehicle, a depending link pivoted to the powered vehicle adjacent the rear end of each of said carrying arms, said links being pivoted to the carrying arms, a second depending link pivoted to the vehicle above each of said carrying arms and spaced forwardly of said first named link, said second links being pivoted to the carrying arms forwardly of the first named links, the upper ends of said first and second links being spaced apart a distance greater than the distance between the lower ends so that when the carrying arms are moved rearwardly, their forward ends are raised, and means on the vehicle for counter-balancing the weight of the frame, said means comprising a transverse shaft journalled on the vehicle, said shaft having a forwardly extending arm fixed thereto, a link pivoted to said arm, said link being pivoted to the frame, a vertical arm fixed to said shaft, a spring connected to said vertical arm and urging the vertical arm rearwardly whereby to raise the forwardly extending arm and lift the frame, and the opposite end of the spring being connected to the vehicle.

No references cited.